M. L. HENDERSON.
TIRE CHAIN.
APPLICATION FILED JUNE 15, 1920.
1,389,870.
Patented Sept. 6, 1921.
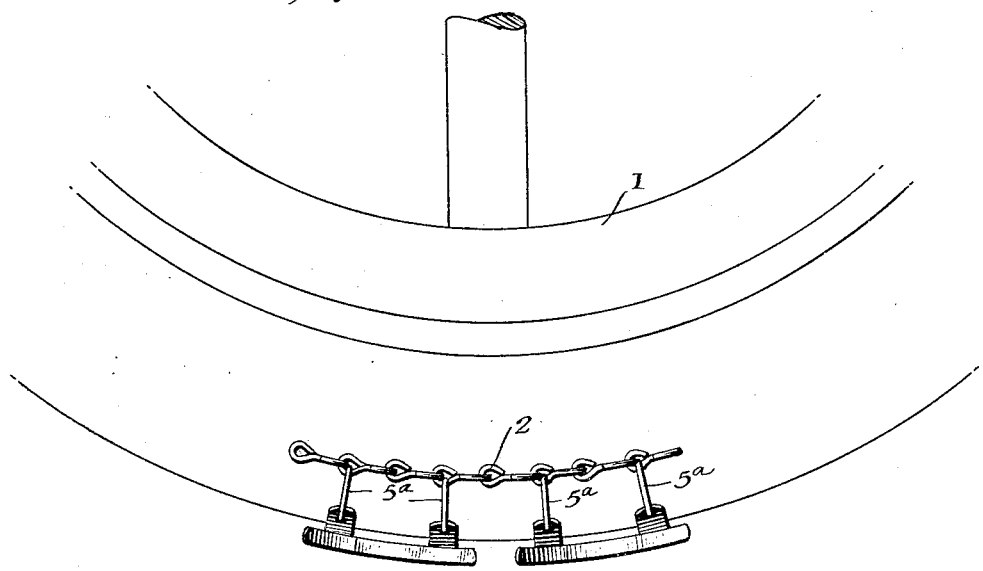
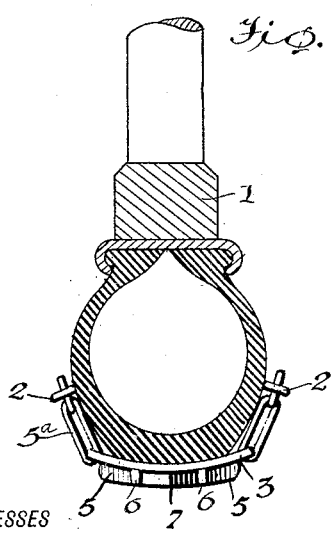
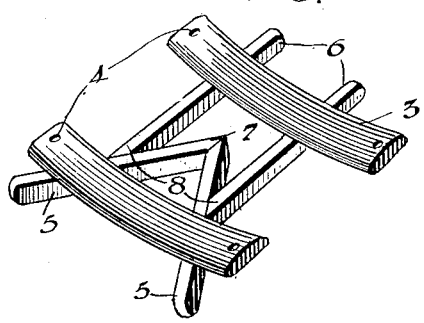
INVENTOR
Monroe L. Henderson

UNITED STATES PATENT OFFICE.

MONROE LYLE HENDERSON, OF MOORE, MONTANA.

TIRE-CHAIN.

1,389,870.

Specification of Letters Patent. Patented Sept. 6, 1921.

Application filed June 15, 1920. Serial No. 389,059.

*To all whom it may concern:*

Be it known that I, MONROE L. HENDERSON, a citizen of the United States, and a resident of Moore, in the county of Fergus and State of Montana, have invented certain new and useful Improvements in Tire-Chains, of which the following is a specification.

My invention is an improvement in tire chains, and has for its object to provide a chain of the character specified which, while inexpensive and easily applied and detached, will hold the wheel from slipping in any direction, either laterally or circumferentially.

In the drawings:

Figure 1 is a side view of a portion of the chain;

Fig. 2 is a transverse section radial to the wheel;

Fig. 3 is a perspective view of one of the links detached.

The present embodiment of the invention comprises a series of tread members or links in the tire chain, which are supported on the wheel 1 by means of side chains 2 of usual construction. Each of the links is composed of two plates 3 which are arched longitudinally to conform with the curvature of the tread of the tire, and these plates are of a length to extend beyond the tread portion at each side.

Each end of each plate is provided with an opening, shown at 4, for engagement by a link 5ª, which connects the plates to the side chains. The plates of each link of the tire chain are connected by the open-work frame of cleat bars or grousers, shown more particularly in Fig. 3.

Each of these frames consists of a pair of bars 5 which are arranged in V-shape, having their ends abutting and diverging toward the opposite ends, and these bars 5 are secured to one of the plates 3. A pair of bars 6 is secured to the other plate 3, the members of the pair being parallel, and the ends of the bars 6 are secured to the outer faces of the bars 5 at approximately their centers, and at the point where the plate 3 crosses the bars 5. The ends of the bars 5, where they abut and the ends of the bars 6 which abut the bars 5, are beveled, as shown at 7 and 8, respectively, to fit smoothly together, and the bars are secured together at these points by means of soldering, brazing or the like, the same method being used to secure the bars 5 and 6 to the plates 3.

The improved chain is composed of as many of these links as may be necessary, the links being spaced apart at their adjacent ends slightly, as shown in Fig. 1. Each of the bars 5 and 6 may be beveled slightly toward its free edge, and when in use the improved chain will resist skidding laterally, either direct or at an angle, and it will also assist traction, resisting tendency of the wheels to slip circumferentially.

The tire chain is composed of a series of links, each of which consists of a pair of plates spaced apart from each other and adapted to extend transversely of the tire and connected by an open frame-work of cleat bars. It will be noted that the cleat bars have their wide dimension perpendicular to the plane of the frame-work and that the bars are so inclined with respect to each other that slip of the wheel in any direction will be resisted.

As illustrated in Fig. 3, the longitudinally curved attaching bars 3 which are adapted to be arranged transversely of the tire have their inner surfaces curved transversely so as to prevent damage to the tire and cutting, whereby the tire will not be injured as the result of continued use of the device.

I claim:

A non-skid device comprising a pair of spaced parallel longitudinally curved attaching plates adapted to be arranged transversely of a tire, a pair of spaced parallel traction bars secured intermediate their ends to the outer side of one of said attaching plates, and a V-shaped traction device inclusive of a pair of diverging branches secured to the other of said attaching plates, the ends of said parallel traction bars being beveled and secured to the intermediate portions of said branches for bracing said V-shaped traction device.

MONROE LYLE HENDERSON.